US012162348B2

(12) United States Patent
Hamaguchi et al.

(10) Patent No.: US 12,162,348 B2
(45) Date of Patent: Dec. 10, 2024

(54) CONTROL DEVICE FOR VEHICLE

(71) Applicant: TOYOTA JIDOSHA KABUSHIKI KAISHA, Toyota (JP)

(72) Inventors: Takeshi Hamaguchi, Seto (JP); Shintaro Saigo, Nisshin (JP); Tomoyuki Doi, Gotemba (JP); Kohei Tochigi, Shizuoka-ken (JP); Minami Sato, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/447,526

(22) Filed: Aug. 10, 2023

(65) Prior Publication Data
US 2024/0131925 A1 Apr. 25, 2024
US 2024/0227553 A9 Jul. 11, 2024

(30) Foreign Application Priority Data

Oct. 19, 2022 (JP) .................................. 2022-167410

(51) Int. Cl.
*B60K 26/02* (2006.01)
*B60K 35/10* (2024.01)
*B60W 50/08* (2020.01)

(52) U.S. Cl.
CPC .............. *B60K 26/02* (2013.01); *B60K 35/10* (2024.01); *B60W 50/08* (2013.01); *B60W 50/082* (2013.01)

(58) Field of Classification Search
CPC .............. B60W 50/085; B60W 50/08; B60W 2420/30; B60W 50/082; B60W 50/10; B60K 26/02; B60K 2360/139; B60K 35/10; B60K 35/29
See application file for complete search history.

(56) References Cited

U.S. PATENT DOCUMENTS

| 5,329,163 | A | * | 7/1994 | Satoh | ..................... | H01H 3/503 |
| | | | | | | 200/557 |
| 7,425,891 | B2 | * | 9/2008 | Colburn | ................. | B60K 37/00 |
| | | | | | | 701/1 |
| 7,788,012 | B2 | * | 8/2010 | Etori | ..................... | B60W 30/16 |
| | | | | | | 701/96 |
| 8,155,837 | B2 | * | 4/2012 | Aoki | ................... | H01H 13/705 |
| | | | | | | 345/184 |

(Continued)

FOREIGN PATENT DOCUMENTS

JP 2005-306362 A 11/2005
JP 2007-196854 A 8/2007
(Continued)

*Primary Examiner* — Paul N Dickson
*Assistant Examiner* — Timothy Wilhelm
(74) *Attorney, Agent, or Firm* — SoraIP, Inc.

(57) ABSTRACT

A control device for a vehicle including an operation unit that receives an operation for setting ON or OFF of a plurality of driver assistance functions, wherein at least two or more driver assistance functions among the plurality of driver assistance functions are driver assistance functions classified into a specific group in which the degree of intervention of control for the driving operation is smaller than other driver assistance functions, and the operation unit includes a main switch for collectively setting ON or OFF of the driver assistance functions classified into the specific group.

5 Claims, 6 Drawing Sheets

(56) References Cited

U.S. PATENT DOCUMENTS

| | | | | |
|---|---|---|---|---|
| 8,818,622 | B2* | 8/2014 | Bergholz | B60K 35/00 |
| | | | | 715/863 |
| 8,983,750 | B2* | 3/2015 | Maruyama | B60W 30/143 |
| | | | | 701/93 |
| 9,266,432 | B2* | 2/2016 | Wilding | B60K 35/10 |
| 9,481,369 | B2* | 11/2016 | Isogai | B60W 30/16 |
| 9,772,626 | B2* | 9/2017 | Bendewald | G01C 21/3694 |
| 9,791,857 | B2* | 10/2017 | Ebe | B60W 30/14 |
| 9,834,213 | B2* | 12/2017 | Okuda | B60W 10/20 |
| 10,150,486 | B2* | 12/2018 | Hoshino | B60W 30/06 |
| 10,173,676 | B2* | 1/2019 | Hanzawa | B60W 50/14 |
| 10,252,726 | B2* | 4/2019 | Emura | B60W 40/09 |
| 10,627,813 | B2* | 4/2020 | Tsuji | G08G 1/16 |
| 10,752,190 | B1* | 8/2020 | Buckley | B60R 16/0373 |
| 11,364,930 | B2* | 6/2022 | Kubota | B60W 50/14 |
| 11,392,270 | B2* | 7/2022 | Takahashi | G06F 3/0482 |
| 11,420,574 | B2* | 8/2022 | Yano | B62D 1/04 |
| 11,544,975 | B2* | 1/2023 | Takahashi | B60W 50/14 |
| 11,618,466 | B2* | 4/2023 | Kobayashi | B60W 40/04 |
| | | | | 701/48 |
| 11,708,082 | B2* | 7/2023 | Nishida | B60W 50/082 |
| | | | | 701/1 |
| 2008/0190681 | A1* | 8/2008 | Mayser | B60K 31/042 |
| | | | | 180/170 |
| 2013/0166146 | A1* | 6/2013 | Tanaka | G06F 3/0488 |
| | | | | 701/36 |
| 2016/0342406 | A1* | 11/2016 | Ahmed | G06F 8/61 |
| 2019/0070957 | A1* | 3/2019 | Nakatsuka | B60W 30/12 |
| 2019/0163288 | A1* | 5/2019 | You | G06F 3/1423 |
| 2020/0178073 | A1* | 6/2020 | Goluguri | H04W 12/02 |
| 2020/0239015 | A1* | 7/2020 | Nishida | B60W 50/14 |
| 2020/0333791 | A1* | 10/2020 | Inoue | B60W 30/0956 |
| 2020/0339174 | A1* | 10/2020 | Sakamaki | B60K 35/00 |
| 2020/0357203 | A1* | 11/2020 | Takahashi | G06T 11/00 |
| 2021/0070314 | A1* | 3/2021 | Matsunaga | B60W 60/0051 |
| 2021/0146943 | A1* | 5/2021 | Oniwa | B60R 21/00 |
| 2022/0185279 | A1* | 6/2022 | Takahama | B60W 30/16 |
| 2022/0292971 | A1* | 9/2022 | Park | G06V 20/586 |
| 2022/0297712 | A1* | 9/2022 | Kajiwara | B60W 30/09 |
| 2022/0340166 | A1* | 10/2022 | Kume | B60K 35/29 |
| 2023/0286509 | A1* | 9/2023 | Kume | B60W 60/0051 |

FOREIGN PATENT DOCUMENTS

| | | |
|---|---|---|
| JP | 2013-129352 A | 7/2013 |
| JP | 2020-183148 A | 11/2020 |

* cited by examiner

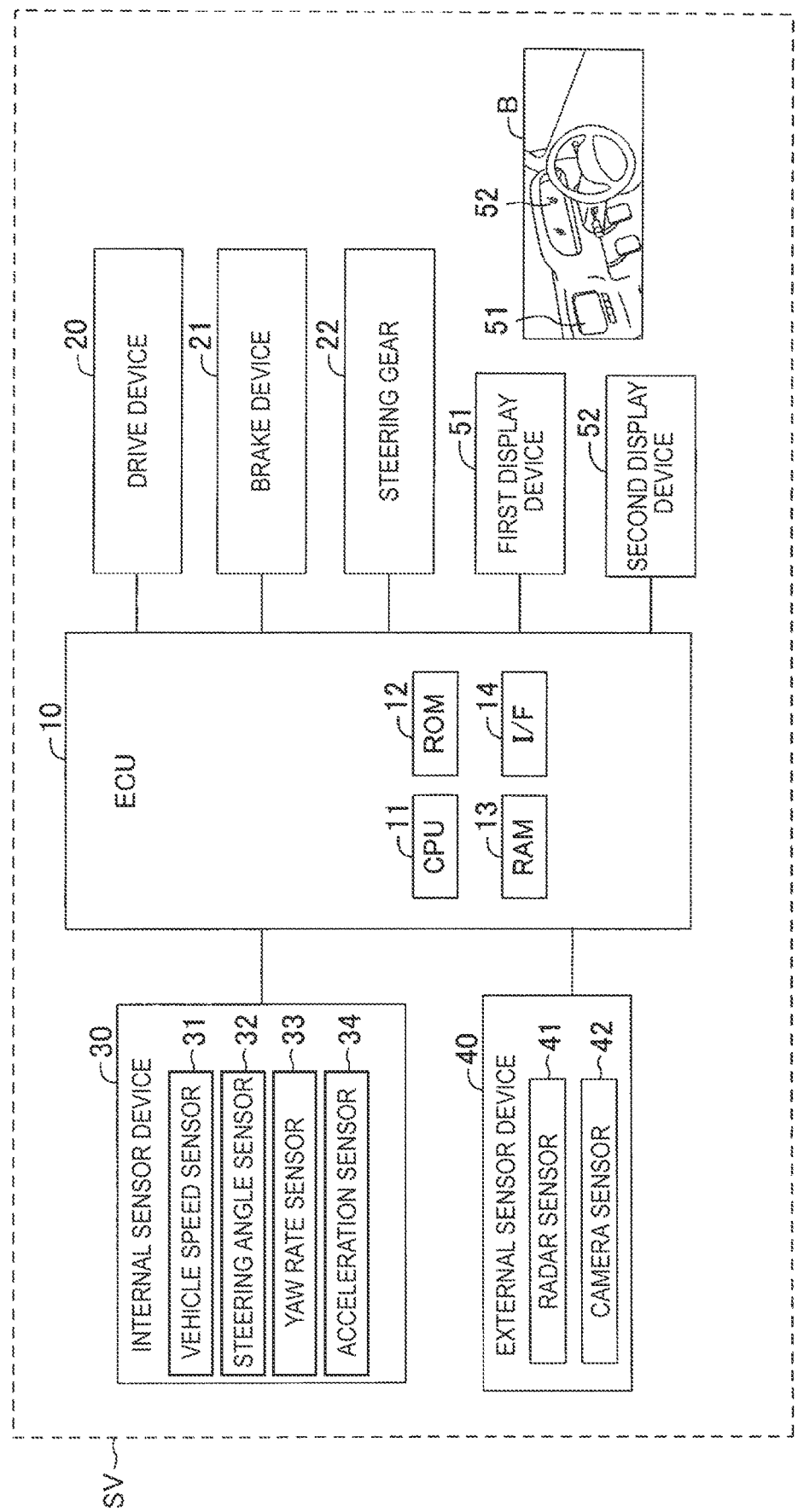

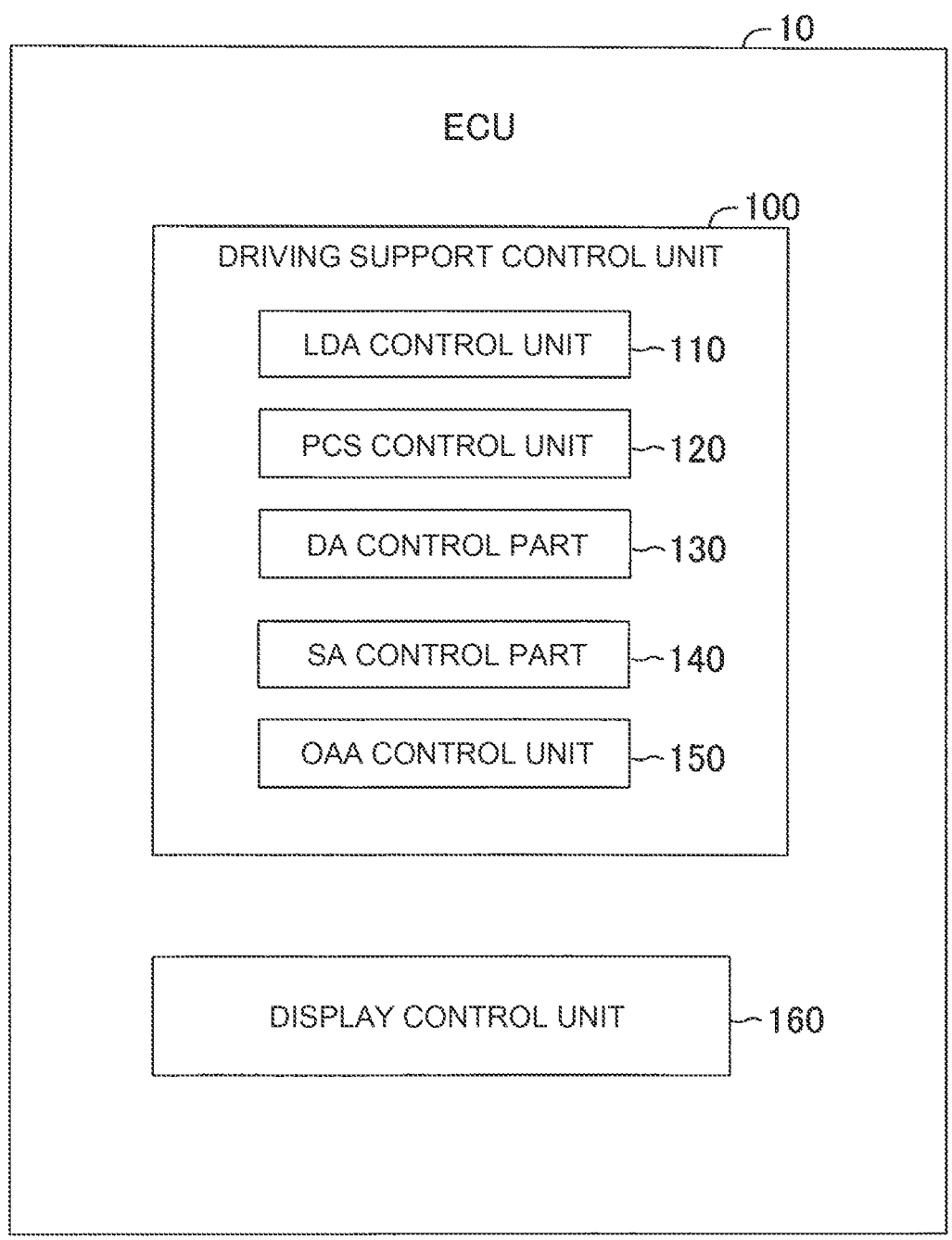

CONTROL DEVICE FOR VEHICLE

CROSS-REFERENCE TO RELATED APPLICATION

This application claims priority to Japanese Patent Application No. 2022-167410 filed on Oct. 19, 2022, incorporated herein by reference in its entirety.

BACKGROUND

1. Technical Field

The present disclosure relates to a control device for a vehicle.

2. Description of Related Art

Japanese Unexamined Patent Application Publication No. 2005-306362 (JP 2005-306362 A) discloses a vehicle driving control device including an inter-vehicle control type constant speed driving system operated by an ON operation of an inter-vehicle control start switch, and a lane keeping system operated by an ON operation of a lateral displacement control start switch. The device described in JP 2005-306362 A cancels a lane keeping system after a predetermined period of time after the inter-vehicle control type constant speed driving system is cancelled when the driver operates a cancellation switch of the inter-vehicle control type constant speed driving system in a state where both the inter-vehicle control type constant speed driving system and the lane keeping system are in operation.

SUMMARY

In general, in a vehicle equipped with a plurality of driver assistance functions, switches for setting on or off of the driver assistance functions are individually provided. However, for example, it may be desirable from the viewpoint of improving operability that for the driver assistance functions in which the driver assistance purposes or the driving scenes using the driver assistance are the same and that can be classified into one group, on or off of the driver assistance functions can be set collectively.

An object of the present disclosure is to effectively improve the operability of turning on or off the driver assistance functions.

The present disclosure is a control device for a vehicle, including an operation unit that accepts an operation for setting on or off of a plurality of driver assistance functions. At least two or more driver assistance functions from among the driver assistance functions are driver assistance functions classified into a specific group with a smaller degree of control intervention with respect to a driving operation than the other driver assistance functions.
The operation unit includes a main switch for collectively setting on or off of the driver assistance functions classified into the specific group.

According to the above aspect, the operator can collectively set on or off of all the driver assistance functions classified into the specific group by operating one main switch. With the above, the operator does not need to individually operate on or off of the driver assistance functions classified into the specific group, and thus the operability can be reliably improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic diagram illustrating a hardware configuration of a vehicle according to the present embodiment;

FIG. 2 is a schematic diagram illustrating a software configuration of the control device according to the present embodiment;

DETAILED DESCRIPTION OF EMBODIMENTS

Figure 3A:
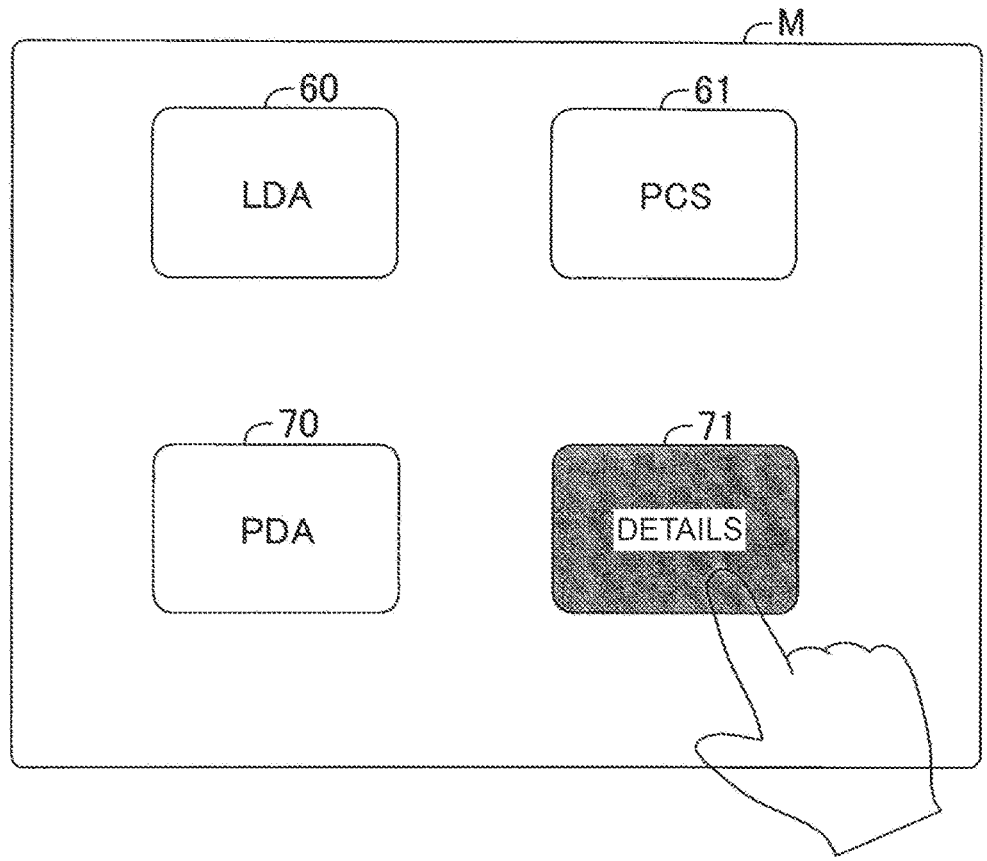
FIG. 3A is a schematic diagram of the main-screen.

Hereinafter, a control device for a vehicle according to the present embodiment will be described with reference to the drawings.

Hardware Configuration

FIG. 1 is a schematic diagram illustrating a hardware configuration of a vehicle SV to which a control device according to the present embodiment is applied.

The vehicle SV has an Electronic Control Unit (ECU) 10. ECU 10 includes a Central Processing Unit (CPU) 11, Read Only Memory (ROM) 12, Random Access Memory (RAM) 13, an interface device 14, and the like. CPU 11 is a processor that executes various programs stored in ROM 12. ROM 12 is a non-volatile memory that stores data and the like required for CPU 11 to execute various programs. RAM 13 provides a working area to be deployed when various programs are executed by CPU 11. The interface device 14 is a communication device for communicating with an external device.

ECU 10 is a central device that performs driving support control for supporting driving by a driver of a vehicle SV. Driving assistance control is a concept including automatic driving control. The drive device 20, the braking device 21, the steering device 22, the internal sensor device 30, the external sensor device 40, the first display device 51, the second display device 52, and the like are communicably connected to ECU 10.

The drive device 20 generates a driving force to be transmitted to the driving wheels of the vehicle SV. Examples of the drive device 20 include an electric motor and an engine. In the present embodiment, the vehicle SV may be any of a hybrid electric vehicle (HEV, a plug-in Hybrid vehicle (PHEV)), a fuel cell electric vehicle (FCEV, a battery electric vehicle (BEV)), and an engine-driven vehicle. The braking device 21 applies a braking force to the wheels of the vehicle SV. The steering device 22 applies a steering force to the wheels of the vehicle SV.

the internal sensor device 30 is a sensor that detects the condition of the vehicle SV. Specifically, the internal sensor device 30 includes a vehicle speed sensor 31, a steering angle sensor 32, a yaw rate sensor 33, an acceleration sensor 34, and the like.

the vehicle speed sensor 31 detects a traveling speed (vehicle speed V) of the vehicle SV. The steering angle sensor 32 detects a rotational angle of a steering wheel or a steering shaft (not shown) of the vehicle SV, that is, a steering angle. The yaw rate sensor 33 detects the yaw rate of the vehicle SV. The acceleration sensor 34 detects an acceleration of the vehicle SV. The internal sensor device 30 transmits the condition of the vehicle SV detected by the sensors 31 to 34 to ECU 10 at a predetermined cycle.

the external sensor device 40 is a sensor or the like that recognizes target information related to a target in the vicinity of SV. Specifically, the external sensor device 40 includes a radar sensor 41, a camera sensor 42, and the like. Here, the target information includes, for example, a surrounding vehicle, a pedestrian, and a bicycle, a division line of a road surface, a curb, a guardrail, a falling object, and the like. The external sensor device 40 transmits the acquired target object data to ECU 10 at a predetermined cycle.

the radar sensor 41 is provided, for example, at a front portion of the vehicle SV, and detects a target present in a front area of the vehicle SV. The radar sensor 41 includes a millimeter wave radar and/or a lidar. The millimeter wave radar emits a millimeter wave and receives a millimeter wave (reflected wave) reflected by a target object existing in a radiation range. The millimeter wave radar acquires the relative distance between the vehicle SV and the target, the relative velocity between the vehicle SV and the target, and the like based on the phase difference between the transmitted millimeter wave and the received reflected wave, the attenuation level of the reflected wave, the time from the transmission of the millimeter wave until the reception of the reflected wave, and the like. The lidar sequentially scans pulsed laser beams having a shorter wavelength than millimeter waves toward a plurality of directions, and receives the reflected light reflected by the targets, thereby obtaining shapes of the targets detected in front of the vehicle SV, relative distances between the vehicle SV and the targets, relative velocities between the vehicle SV and the targets, and the like.

The camera sensor 42 is, for example, a stereo camera or a monocular camera, and a digital camera having an image sensor such as a CMOS or a CCD can be used. The camera sensor 42 is disposed, for example, on an upper portion of a windshield glass of a vehicle SV. The camera sensor 42 captures an image in front of the vehicle SV and processes the captured image-data to acquire target information in front of the vehicle SV. The target information is information indicating a type of a target detected in front of the vehicle SV, a relative distance between the vehicle SV and the target, a relative velocity between the vehicle SV and the target, and the like. The type of the target may be recognized by machine learning such as pattern matching, for example.

As shown in block B of FIG. 1, the first display device 51 is a touch panel type display (for example, a touch panel type liquid crystal display) disposed substantially in the center of the instrument panel in the width direction. As the first display device 51, for example, a touch panel type display included in a navigation device (not shown) can be used, but may be a touch panel type display independent of the navigation device. The first display device 51 is configured with a specific image, and displays a switch for accepting an operation by an operator. The switch displayed on the first display device 51 is operated by the operator touching the switch. When a touch operation is performed on the switch displayed on the first display device 51, an operation signal corresponding to the touch operation is transmitted to ECU 10.

As shown in block B of FIG. 1, the second display device 52 is a multi-information display (for example, a liquid crystal display) disposed at a position in front of the driver's seat of the instrument panel. On the second display device 52, icons and indicators composed of specific images, switches for accepting an operation by an operator, and the like are displayed. The switch displayed on the second display device 52 is selected by the operator operating a steering switch or the like provided on the steering wheel. When a selection operation is performed on the switch displayed on the second display device 52, an operation signal corresponding to the operation is transmitted to ECU 10.

Software Configuration

FIG. 2 is a schematic diagram illustrating a software configuration of ECU 10 according to the present embodiment. As illustrated in FIG. 2, ECU 10 includes a driver assistance control unit 100 and a display control unit 160 as functional elements. Further, the driver assistance control unit 100 includes a Lane Departure Alert (LDA) control unit 110, a Pre-Crash Safety (PCS) control unit 120, a Deceleration Assist (DA) control unit 130, a Steering Assist (SA) control unit 140, and an Obstacles Anticipation Assist (OAA) control unit 150 as functional elements. These functional elements 100 to 160 are realized by CPU 11 of ECU 10 reading a program stored in ROM 12 into a RAM 13 and executing the program. It should be noted that although the functional elements 100 to 160 are described as being included in an ECU 10 which is integral hardware in the present embodiment, any one of them may be provided in another ECU separate from ECU 10. In addition, all or a part of the functional elements 100 to 160 of ECU 10 may be provided in an information processing device of a facility (for example, a managing center) capable of communicating with the vehicle SV.

LDA control unit 110 executes LDA control for suppressing a deviation of the vehicle SV from the traveling lane when the vehicle SV is likely to deviate from the traveling lane. LDA control unit 110 recognizes the border of the traveling lane in which the vehicle SV is traveling on the basis of the detection result of the external sensor device 40. Here, the traveling lane refers to a traveling area defined by a structure such as a curb, a guardrail, or a wall as well as lanes such as left and right white lines and yellow lines drawn on a road surface. When recognizing the boundary of the traveling lane, LDA control unit 110 calculates a predicted arrival time until SV of vehicles reaches the boundary, and starts LDA control when the predicted arrival time becomes equal to or less than a predetermined threshold time. When LDA control is started, LDA control unit 110 sets a target steering angle for suppressing the vehicle SV from deviating outward from the border. Further, LDA control unit 110 controls the operation of the steering device 22 based on the set target steering angle. Thus, the steered wheels of the vehicle SV are steered, and LDA control for suppressing a deviation from the traveling lanes of the vehicle SV is realized.

PCS control unit 120 executes PCS control for avoiding collision between the vehicle SV and the front obstacle or reducing damage to the collision. PCS control unit 120 determines whether an object existing in front of the vehicle SV is an obstacle that may collide with the vehicle SV based on the detection results of the internal sensor device 30 and the external sensor device 40. For example, when the forward object is a moving object, PCS control unit 120 determines that the moving object is an obstacle when the trajectory of the moving object and the trajectory of the vehicle SV intersect each other. When the forward object is a stationary object, PCS control unit 120 determines that the stationary object is an obstacle when the trajectory of the vehicle SV intersects the present position of the stationary object.

PCS control unit 120 determines that the front object is an obstacle. PCS control unit 120 calculates Time to Collision (hereinafter, TTC) by dividing the distance from the vehicle SV to the obstacle by the relative velocity. PCS control unit 120 sets a target steering angle for avoiding collision between the vehicle SV and an obstacle when TTC is equal to or less than a predetermined collision determination threshold. Further, PCS control unit 110 controls the operation of the steering device 22 based on the set target steering angle. Thus, the steered wheels of the vehicle SV are steered, and PCS control for avoiding a collision between the vehicle SV and the front obstacle or reducing damage is realized. Note that PCS control is not limited to the steering control. PCS control may be a deceleration control for decelerating the vehicle SV at a predetermined target deceleration.

DA control unit 130 executes DA control for assisting the driver of the vehicle SV to decelerate. DA control unit 130 detects a preceding vehicle traveling in front of the vehicle SV or an interrupted vehicle interrupted from an adjoining lane as a forward object based on the detection result of the external sensor device 40. When a forward object is detected, DA control unit 130 executes DA control for assisting the driver to decelerate the vehicle so that the distance between the vehicles does not become too close. In addition, when the curve (curved road) is detected in front of the vehicle SV based on the detection result of the external sensor device 40, DA control unit 130 determines whether the vehicle speed V is faster than the curve based on the detection result of the vehicle speed sensor 31. When determining that the vehicle speed V is high, DA control unit 130 executes DA control for assisting the driver in decelerating the vehicle. DA control unit 130 sets a predetermined target deceleration at which the deceleration of the vehicle SV becomes appropriate while maintaining the driver's sense of subject. Further, DA control unit 130 controls the operation of the braking device 21 based on the set target deceleration. Thus, DA control for decelerating SV of the vehicle at a desired target deceleration while maintaining the driver's sense of subject is realized.

SA control unit 140 executes SA control for assisting the driver of the vehicle SV to steer. SA control unit 140 determines whether or not the vehicle SV is traveling on the curve based on the detection result of the external sensor device 40. When determining that the vehicle SV is traveling on the curve, SA control unit 140 predicts an appropriate manipulation quantity of the driver based on the detection results of the internal sensor device 30 and the external sensor device 40. The proper operation amount is an operation amount of the steering wheel that is normally performed by the driver in accordance with the surrounding conditions of the vehicle SV. SA control unit 140 sets a proper operation amount range including the predicted proper operation amount, and determines whether the actual steering operation amount of the driver is included in the proper operation amount range. The steering operation amount of the driver may be acquired based on the detection result of the steering angle sensor 32. When the steering operation amount of the driver is not included in the proper operation amount range, SA control unit 140 sets a target steering reaction force that facilitates keeping the steering operation amount of the driver in the proper operation amount range. Further, SA control unit 140 controls the operation of the steering device 22 based on the set target steering reaction force. Thus, a SA control is realized in which a steering reaction force is applied to the steering wheel to make it easier to keep the steering operation amount of the driver in the proper operation amount range while maintaining the driver's main sensation.

OAA control unit 150 performs OAA control for pre-reading obstacles around the vehicle SV (mainly, the front and front sides) and assisting the driver of the vehicle SV in decelerating operation or steering operation. OAA control unit 150 detects a front object such as a pedestrian or a bicycle crossing a road in front of the vehicle SV based on the detection result of the external sensor device 40. When a forward object is detected, OAA control unit 150 executes OAA control for assisting the driver in decelerating in order to reduce the possibility of colliding with the forward object. In this situation, OAA control unit 150 sets a target deceleration at which the deceleration of the vehicle SV becomes appropriate, and controls the operation of the braking device 21 based on the set target deceleration. This achieves OAA control that effectively reduces the possibility of the vehicle SV colliding with the front object while maintaining the driver's principal feeling.

OAA control unit 150 detects a front side object such as a pedestrian, a bicycle, or a parked vehicle on the front side of the vehicle SV based on the detection result of the external sensor device 40. When the front side object is detected, OAA control unit 150 executes OAA control for assisting the deceleration operation and the steering operation of the driver so that the vehicle SV does not come too close to the front side object. OAA control unit 150 sets a target deceleration at which the deceleration of the vehicle SV is appropriate, and a target steering angle at which the steering angle of the vehicle SV is appropriate, while maintaining the subject feeling of the driver. Further, OAA control unit 150 controls the operation of the braking device 21 based on the set target deceleration and controls the operation of the steering device 22 based on the set target steering angle. Accordingly, OAA control that effectively suppresses the approach of the vehicle SV to the front side object is realized while maintaining the driver's principal feeling.

Here, the above-described driving support control will be arranged. LDA control and PCS control are executed in order to avoid dangers or the like of SV of vehicles, and are driving assistance control of a system-based vehicle that is highly traceable to a target control variable. That is, LDA control and PCS control can be said to be driving assistance control in which the degree of control intervention with respect to driving manipulation is large. On the other hand, DA control, SA control, and OAA control support the driving so that the driver can comfortably travel on the road or the like, and are the driver-based driving support control that has low followability to the target control quantity. That is, DA control, SA control, and OAA control can be said to be the driving assistance control in which the degree of control intervention for driving manipulation is smaller than that for LDA control and PCS control. The driver-based driving assistance control with a low degree of intervention in such control is hereinafter referred to as Proactive Driving Assist (PDA).

The driver assistance functions (DA, SA, OAA) of PDA are effective under the same conditions or in driving conditions, for example, when the vehicle SV is traveling on a normal road. Therefore, it is desirable to be able to collectively set on/off of the respective driver assistance functions of PDA from the viewpoint of improving the operability of the driver.

The display control unit 160 displays, on the first display device 51, a switch for receiving an operation for setting ON or OFF of each driver assistance function. The display control unit 160 has a two-layer structure in which switches have an upper layer and a lower layer. By enabling the on/off of PDA (DA, SA, OAA) to be collectively set in the upper layer, the operability is improved. Hereinafter, the display processing of the switch by the display control unit 160 will be described in detail. Note that the display of the switches of the respective driver assistance functions is not limited to the first display device 51, and may be displayed on the second display device 52. In this case, the switch of each driver assistance function displayed on the second display device 52 may be selected by, for example, operating a steering switch. Hereinafter, a case where the switch is displayed on the first display device 51 will be described as an example. It is assumed that the second display device 52 displays indicators indicating on/off of PDA.

Figure 3B:
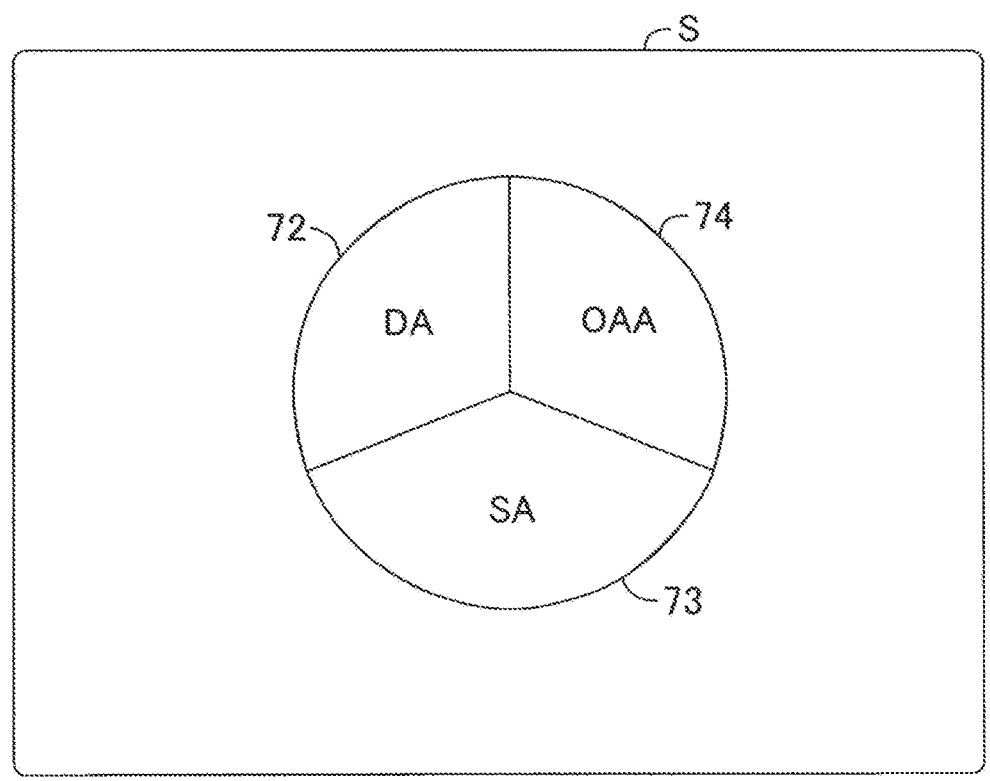
FIG. 3B is a schematic diagram of a sub-screen.

FIG. 3A is a schematic diagram of a main-screen M displayed on the first display device 51 by the display control unit 160. FIG. 3B is a schematic diagram of a sub-screen S displayed on the first display device 51 by the display control unit 160. On the main screen M, a LDA switch 60 for setting ON/OFF of LDA and a PCS switch 61 for setting ON/OFF of PCS are displayed. When the operator touches the switches 60 and 61, an operation signal corresponding to the touch operation is transmitted from the first display device 51 to ECU 10, so that the operation or non-operation of LDA or PCS can be switched.

On the main screen M, a PDA switch 70 for setting on/off of the respective driver assistance functions (DA, SA, OAA) of PDA at once is displayed. PDA switch 70 is an upper-layer switch, and is an exemplary main switch of the present disclosure. When the operator touches PDA switch 70, the operation signal corresponding to the touch operation is transmitted from the first display device 51 to ECU 10, so that the operation or non-operation of the respective driver assistance functions of PDA can be switched collectively. As a result, the operator does not need to individually set the respective driver assistance functions of PDA, and thus the operability can be improved. Further, by enabling the collective operation, it is possible to shorten the time for the driver to temporarily release his or her hand from the steering wheel for the touch operation and the time for the driver's line of sight to deviate from the front, compared with the case of operating individually, and it is also possible to improve safety.

A detail switch 71 is displayed in the vicinity of PDA switch 70 (on the right side in the illustrated embodiment) of the main screen M. The detail switch 71 is a switch for switching the screen displayed on the first display device 51 from the main screen M to the sub screen S. When the operator touches the detail switch 71, the screen displayed on the first display device 51 is switched from the main screen M to the sub screen S.

As shown in FIG. 3B, the sub-screen S displays a DA switch 72, a SA switch 73, and a OAA switch 74 for individually setting on/off of the respective driver assistance functions (DA, SA, OAA) of PDA. DA switch 72, SA switch 73, and OAA switch 74 are lower level switches, and are exemplary sub-switches of the present disclosure. When the operator touches the switches 72, 73, and 74 individually, an operation signal corresponding to the touch operation is transmitted from the first display device 51 to ECU 10, so that the operation or non-operation of the respective driver assistance functions of PDA can be switched individually. As described above, the switch of PDA has a two-tiered structure including an upper tier and a lower tier, so that the size of the switches 60, 61, 70, 71, 72, 73, and 74 displayed on the first display device 51, i.e., the display area, can be secured larger than when the switch has a one-tiered structure. As a result, even when the driver's body is swung due to the traveling of the vehicle SV, the switch can be reliably operated.

Here, when on/off of PDA switch 70 in the upper layer and on/off of DA switch 72, SA switch 73, and OAA switch 74 in the lower layer are not interlocked with each other, the following problems may occur.
 (1) When PDA switch 70 of the upper layer is on and the operator sets all of DA switch 72, SA switch 73, and OAA switch 74 of the lower layer on the sub-screen S to off and then returns to the main screen M, the operator erroneously recognizes that DA, SA, and OAA are set to ON even though none of them is valid.
 (2) When DA switch 72, SA switch 73, and OAA switch 74 in the lower layer are all in the off-state and the operator operates PDA switch 70 in the upper layer on the main screen M, DA switch 72, SA switch 73, and OAA switch 74 in the lower layer are all maintained in the off-state, although PDA switch 70 in the upper layer is switched on or off. Therefore, the operator cannot grasp the reason why the driver assistance function is not enabled unless switching from the main screen M to the sub screen S.
 (3) PDA switch 70 is kept off and the driver assistance function is not enabled even if the operator sets at least one of DA switch 72, SA switch 73, and OAA switch 74 on the sub-screen S while PDA switch 70 on the upper layer is off. That is, only by setting at least one of the lower-layer DA switch 72, SA switch 73, and OAA switch 74 to ON, the driver assistance function is not enabled, and the operator returns to the main screen M, and PDA switch 70 must be switched from OFF to ON.

The display control unit 160 interlocks the on/off state of PDA switch 70 in the upper layer with the on/off state of DA switch 72, SA switch 73, and OAA switch 74 in the lower layer, thereby solving the problems (1) to (3). A detailed description of the interlocking will be given below with reference to FIGS. 4A and 6B. Note that, from FIGS. 4A to 6B, the switches that are set to "ON" are colored in gray. In addition, PDA indicators displayed on the second display device 52 are shown in the block C in the drawing. PDA indicators are displayed when PDA is enabled and not displayed when PDA is disabled.

Figure 4A:
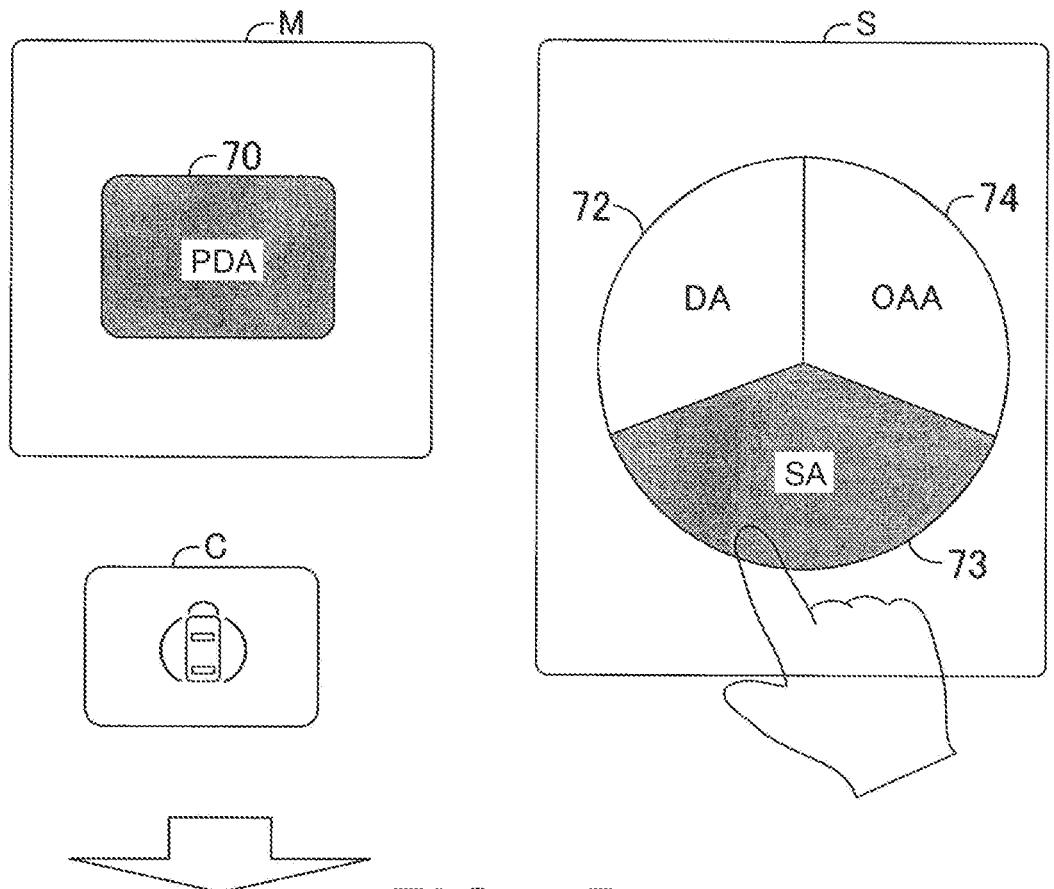
FIG. 4A is a schematic diagram of a lower-level switch for describing on-off linkage of switches.
Figure 4B:
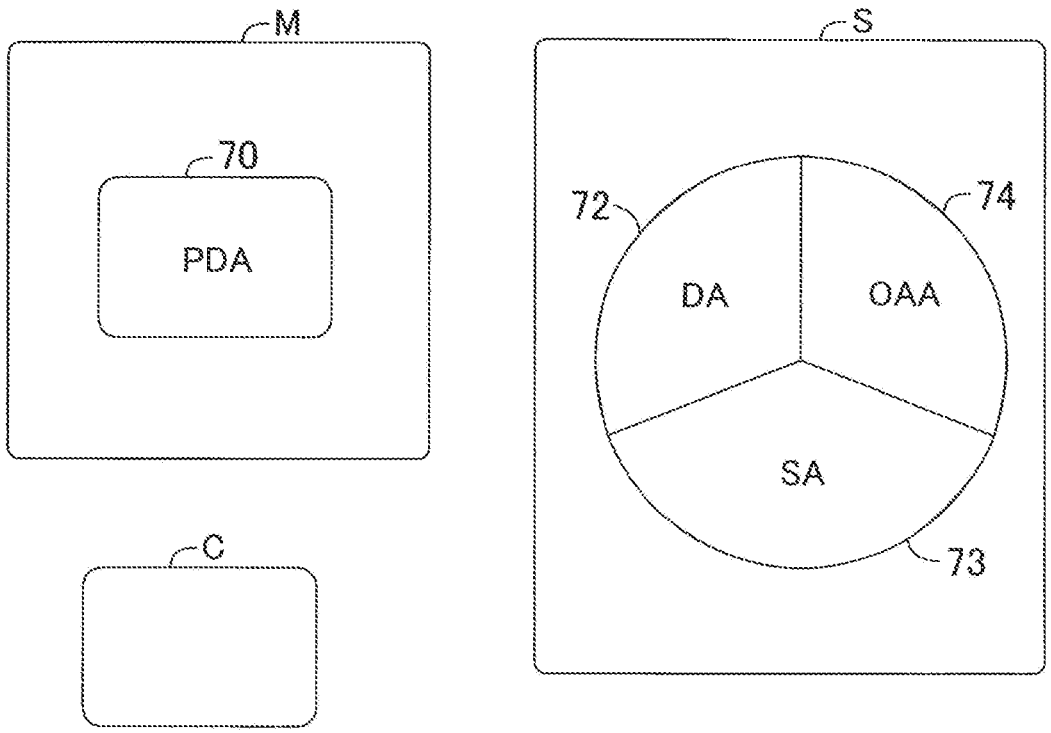
FIG. 4B is a schematic diagram of an upper-level switch for explaining the interlocking of on/off of switches.

FIGS. 4A and 4B solve the above-described issue (1). As shown in FIG. 4A, it is assumed that PDA switch 70 in the upper layer is on and the operator sets all DA switches 72, SA switches 73, and OAA switches 74 in the lower layer on the sub-screen S to off. As illustrated in FIG. 4B, the display control unit 160 switches PDA switches 70 of the upper layer to the off state in conjunction with the off states of DA switches 72, SA switches 73, and OAA switches 74 of the lower layer. Thus, for example, even if the sub-screen S returns to the main screen M, the operator can easily recognize that the functions of DA, SA, and OAA are not all valid by looking at the off-state (or the non-display of PDA indicators) of PDA switch 70. That is, it is possible to effectively suppress the operator from misrecognizing that DA and SA and OAA are valid.

Figure 5A:
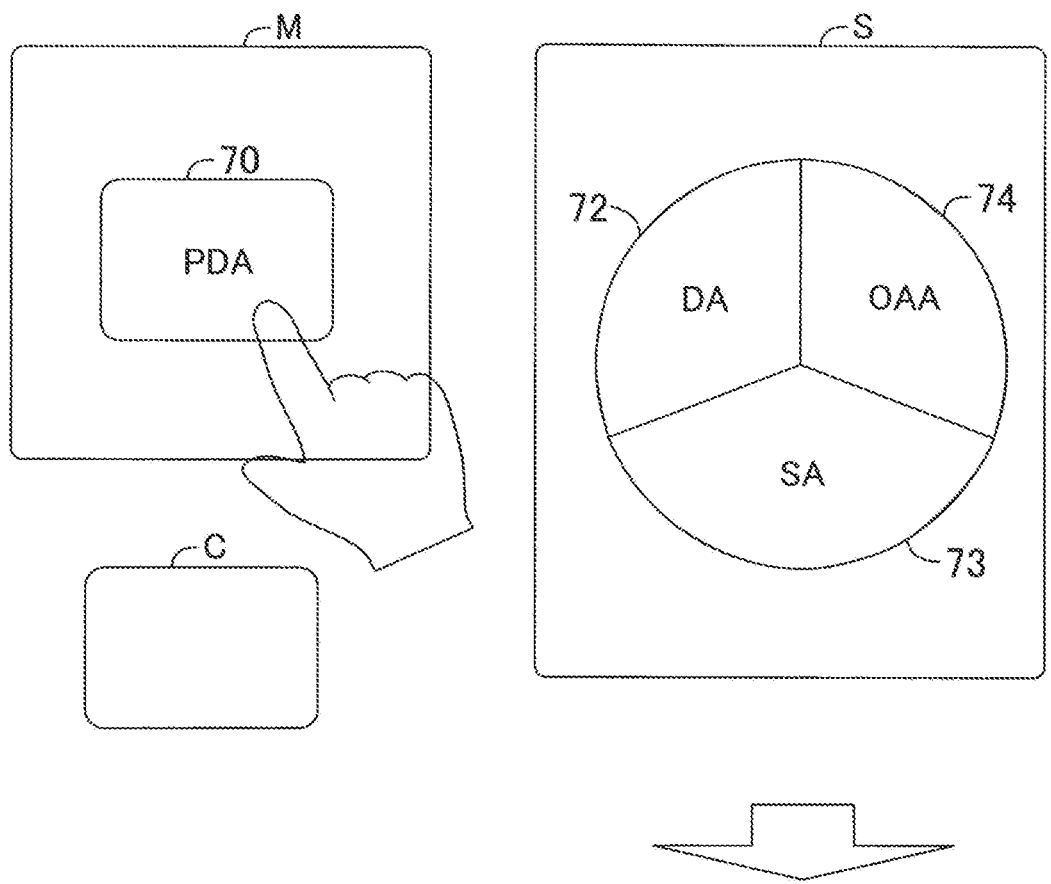
FIG. 5A is a schematic diagram of a lower-level switch for describing on-off linkage of switches.
Figure 5B:
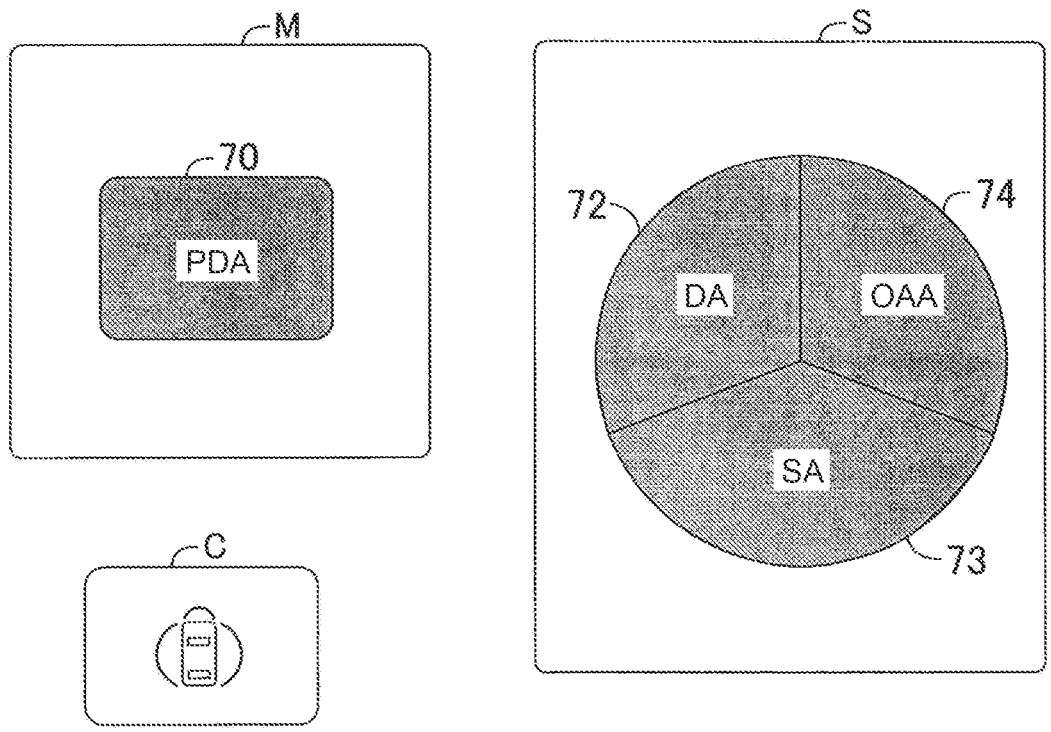
FIG. 5B is a schematic diagram of an upper-level switch for explaining the interlocking of on/off of switches.

FIGS. 5A and 5B solve the above-described issue (2). As shown in FIG. 5A, it is assumed that DA switch 72, SA switch 73, and OAA switch 74 of the lower layer are all turned off, and the operator sets PDA switch 70 of the upper layer on the main screen M to ON. As illustrated in FIG. 5B, the display control unit 160 switches on DA switch 72, SA switch 73, and OAA switch 74 in the lower layer in conjunction with the ON of PDA switch 70 in the upper layer. As a result, the operator can turn on the switches 72, 73, and 74 in the lower layer collectively by PDA switches 70 on the main screen M without switching the main screen M to the sub screen S. In addition, since the switches 72, 73, and 74 in the lower layer are switched on in conjunction with each other, the operator can recognize the setting of the switch without moving from the main screen M to the sub screen S.

Note that, although the detailed drawings are omitted, when at least one of the lower-layer DA switch 72, SA switch 73, and OAA switch 74 is on and the operator switches the upper-layer PDA switch 70 on the main screen M from on to off, all the switches 72, 73, and 74 in the lower-layer are also set to off. That is, the switches 72, 73, and 74 in the lower layer can be set to be off collectively in conjunction with the off-state of PDA switch 70.

Figure 6A:
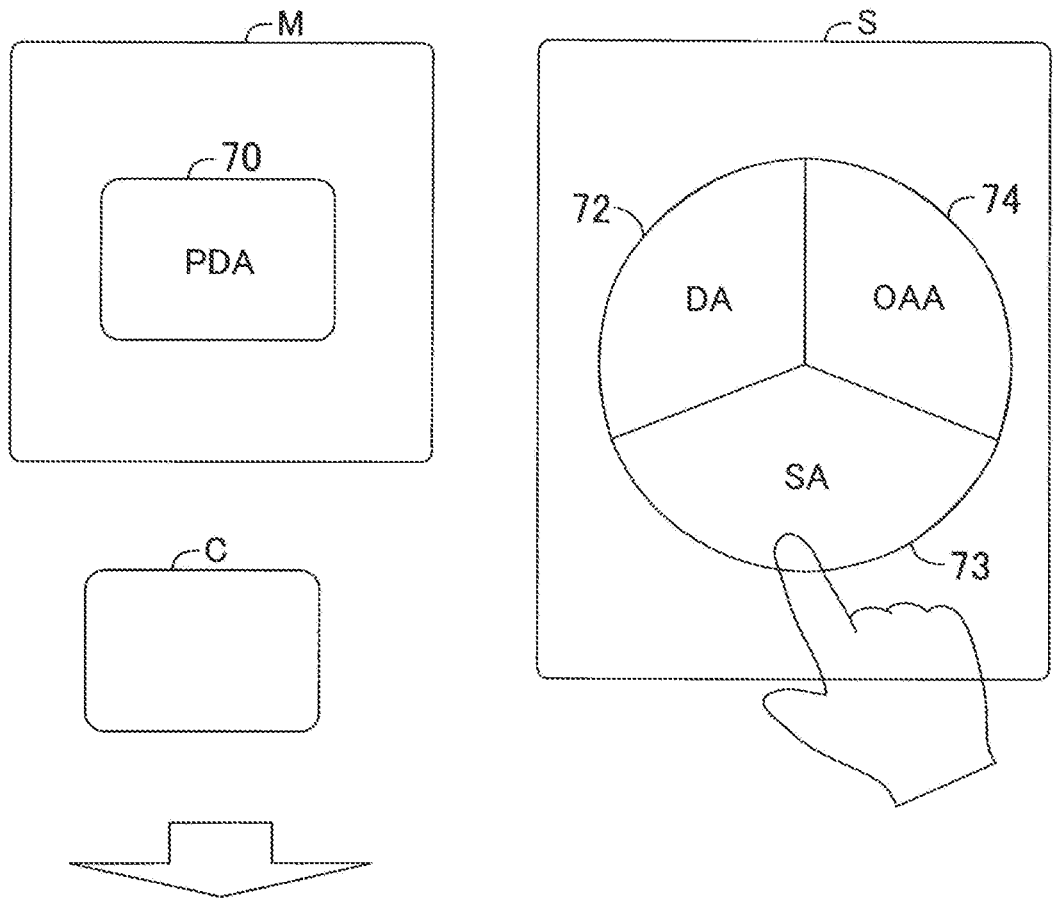
FIG. 6A is a schematic diagram of a lower-level switch for describing on-off linkage of switches.
Figure 6B:
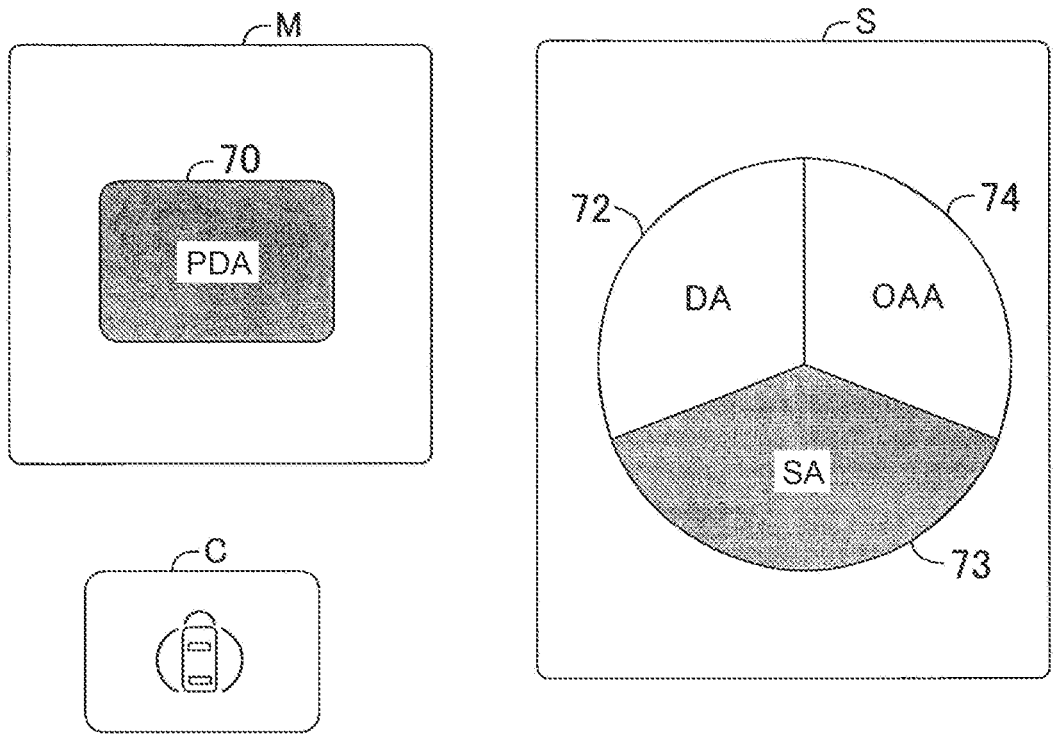
FIG. 6B is a schematic diagram of an upper-layer switch for explaining the interlocking of on/off of the switches.

FIGS. 6A and 6B solve the above-described issue (3). As shown in FIG. 6A, it is assumed that PDA switch 70 in the upper layer is turned off, and the operator sets at least one of DA switch 72, SA switch 73, and OAA switch 74 in the lower layer on the sub-screen S (in the illustrated embodiment, SA switch 73) to ON. As shown in FIG. 6B, the display control unit 160 switches PDA switches 70 of the upper layer to the ON state in conjunction with the switches 72, 73, and 74 of the lower layer. Thus, for example, when at least one of DA switch 72, SA switch 73, and OAA switch 74 is turned on on the sub-screen S, PDA can be effectively operated without returning to the main screen M and turning on PDA switch 70. That is, it is possible to suppress the operation from being performed twice.

Although the control device of the vehicle according to the present embodiment has been described above, the present disclosure is not limited to the above-described embodiment, and various modifications can be made without departing from the object of the present disclosure.

For example, in the above embodiment, the driver assistance functions (DA, SA, OAA) of PDA have been described as being classified into the specific groups of the present disclosure. However, other driver assistance functions may be set as the specific groups, and on/off of the driving support functions may be set collectively. Further, although each switch displayed on the first display device 51 has been described as being set to be on or off by a touch operation by an operator, it is also possible to set to be on or off by an operation other than a touch operation, voice recognition, or the like. The present disclosure can also be applied to an autonomous vehicle that automatically performs some or all of the driving operations.

What is claimed is:

1. A control device for a vehicle, comprising:
   a display device including a touchscreen, the display device being configured to accept an operation by an occupant;
   a processor configured to
   control a plurality of driver assistance functions based on the operation, the plurality of driver assistance functions including at least two or more driver assistance functions classified into a specific group, the at least two or more driver assistance functions each having a lower followability to a target control quantity than the other driver assistance functions included in the plurality of driver assistance functions; and
   cause the display device to display a main screen including a main switch to accept the operation for setting all the at least two or more driver assistance functions classified into the specific group uniformly to either an active state or an inactive state, wherein
   the main screen further includes a detail switch to open a sub-screen, and
   the processor is further configured to cause the display device to display the sub-screen in response to the operation to the detail switch, the sub-screen including a plurality of sub-switches to accept the operation for individually setting the at least two or more driver assistance functions classified into the specific group to the active state or the inactive state.

2. The control device according to claim 1, wherein the processor is configured to cause the display device to display the main screen with the main switch being off in response to the operation to turn off all the sub-switches in a state where the main switch is on and at least one of the sub-switches is on and the subsequent operation to open the main screen.

3. The control device according to claim 1, wherein the processor is configured to cause the display device to display the sub-screen with all the sub-switches being on in response to the operation to turn on the main switch in a state where the sub-switches are all off and the subsequent operation to open the sub-screen.

4. The control device according to claim 1 wherein the processor is configured to cause the display device to display the main screen with the main switch being on in response to the operation to turn on at least one of the sub-switches in a state where the main switch is off and the subsequent operation to open the main screen.

5. The control device according to claim 1, wherein
   the plurality of driver assistance functions includes a Lane Departure Alert (LDA), a Pre-Crash Safety (PCS), a Deceleration Assist (DA), a Steering Assist (SA), and an Obstacles Anticipation Assist (OAA), and
   the DA, the SA, and the OAA are classified into the specific group.

* * * * *